US009601024B2

(12) United States Patent
Morgan et al.

(10) Patent No.: US 9,601,024 B2
(45) Date of Patent: Mar. 21, 2017

(54) ONLINE PROCTORING PROCESS FOR DISTANCE-BASED TESTING

(71) Applicant: ProctorU, INC., Hoover, AL (US)

(72) Inventors: Jarrod Morgan, Maylene, AL (US); Andrew Millin, Kalamazoo, MI (US)

(73) Assignee: PROCTORU INC., Hoover, AL (US)

( * ) Notice: Subject to any disclaimer, the term of this patent is extended or adjusted under 35 U.S.C. 154(b) by 183 days.

(21) Appl. No.: 14/067,796

(22) Filed: Oct. 30, 2013

(65) Prior Publication Data
US 2014/0212865 A1 Jul. 31, 2014

Related U.S. Application Data

(63) Continuation of application No. 13/007,341, filed on Jan. 14, 2011, now abandoned.

(60) Provisional application No. 61/295,508, filed on Jan. 15, 2010.

(51) Int. Cl.
*G09B 5/00* (2006.01)
*G09B 7/00* (2006.01)

(52) U.S. Cl.
CPC ...... *G09B 5/00* (2013.01); *G09B 7/00* (2013.01)

(58) Field of Classification Search
USPC .......................................................... 434/322
See application file for complete search history.

(56) References Cited

U.S. PATENT DOCUMENTS

| | | | |
|---|---|---|---|
| 5,915,973 A | 6/1999 | Hoehn-Saric et al. | |
| 8,244,566 B1 * | 8/2012 | Coley et al. | 705/7.11 |
| 2002/0172931 A1 | 11/2002 | Greene et al. | |
| 2003/0046670 A1 | 3/2003 | Marlow | |
| 2003/0105959 A1 | 6/2003 | Matyas et al. | |
| 2004/0110119 A1 | 6/2004 | Riconda et al. | |
| 2006/0047553 A1 * | 3/2006 | Fuhrmann et al. | 705/8 |
| 2007/0021997 A1 * | 1/2007 | Hayes et al. | 705/9 |
| 2007/0048723 A1 | 3/2007 | Brewer et al. | |
| 2007/0117083 A1 * | 5/2007 | Winneg et al. | 434/350 |
| 2008/0014569 A1 * | 1/2008 | Holiday et al. | 434/351 |
| 2008/0104618 A1 | 5/2008 | Rogers et al. | |

(Continued)

*Primary Examiner* — James Hull

(74) *Attorney, Agent, or Firm* — Squire Patton Boggs (US) LLP

(57) ABSTRACT

A system for enabling real time live proctoring of an exam across a distributed network includes a first remote computer. The first remote computer is capable of real time audio visual capture and display of an image of a user of the first remote computer. A second remote computer is capable of real time audio visual capture and display of an image of the user of the second remote computer. A server is in communication with the first remote computer and the second remote computer, and provides an interactive web based scheduling portal accessible from the first remote computer and the second remote computer. A database is associated with the server for storing data regarding the rules for proctoring of an exam including the rate at which an exam may be proctored at a given date and time. The server enables access to a virtual exam room by the first remote computer and the second remote computer in response to a request from the first remote computer through the scheduling portal for a date and time to take an exam administered at the first computer when the requested date and time fulfils the rules stored in the database.

12 Claims, 21 Drawing Sheets

(56) References Cited

U.S. PATENT DOCUMENTS

2009/0064321 A1* 3/2009 Dick et al. .................. 726/21
2009/0307610 A1* 12/2009 Ryan .......................... 715/756
2010/0055659 A1* 3/2010 Rogers et al. ............... 434/362
2012/0077176 A1* 3/2012 Foster et al. ................ 434/362

* cited by examiner

The ProctorU Scheduling Portal login page

FIG. 3 Scheduling Portal

FIG. 4

Exam reservation interface

FIG. 5

Scheduling Portal showing the countdown clock that indicates when a student's assessment will begin.

FIG. 6

Scheduling Portal showing the button that allows students to begin their proctoring session.

Flow of communication and connectivity between proctor and student.

FIG. 8

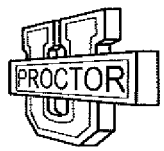

The 3 Steps to Take Your Exam

Step 1: Connect Your Cam. You should see yourself below, and a call should automatically initiate. If you have trouble or youre call doesn't begin within 30 seconds, skip to step two so your proctor can help you.

Step 2: Connect Your Screen. Fill out your name, school, and contact number, and click "connect your screen". A download will start, that you will need to "run" or "open". If you have problems connecting, please call 205-870-8122.

Please enter your name:  
Please enter your school: ← 800  
Please enter a contact phone number:

[Connect Your Screen]

Step 3: Authenticate. Once your proctor is watching, authenticate yourself.

[Authenticate]

1. Make sure your web cam is plugged in and your speakers are plugged in and turned on.

2. Be sure that no other program is running other than this browser window.

3. Your call should begin immediately. If you lose connection or do not reach someone, press the "refresh" button on your browser. If a window pops up with a question, hit "allow". You will be connected to your proctor via the window above.

4. After verifying you are ready to take your exam, you proctor will help you start your exam.

5. You are not allowed to leave sight of the web cam during your exam. If situations arise, please notify your proctor.

IF TECHNICAL ISSUES ARISE, PLEASE CONTACT 205-070-8122

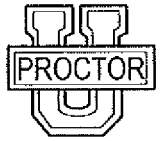

Session I.D:  
ind9adcpnvvz6jpx  
Session ID is for proctor use only

FIG. 9

The proctored exams report.

FIG. 10

The exam capacity throttle

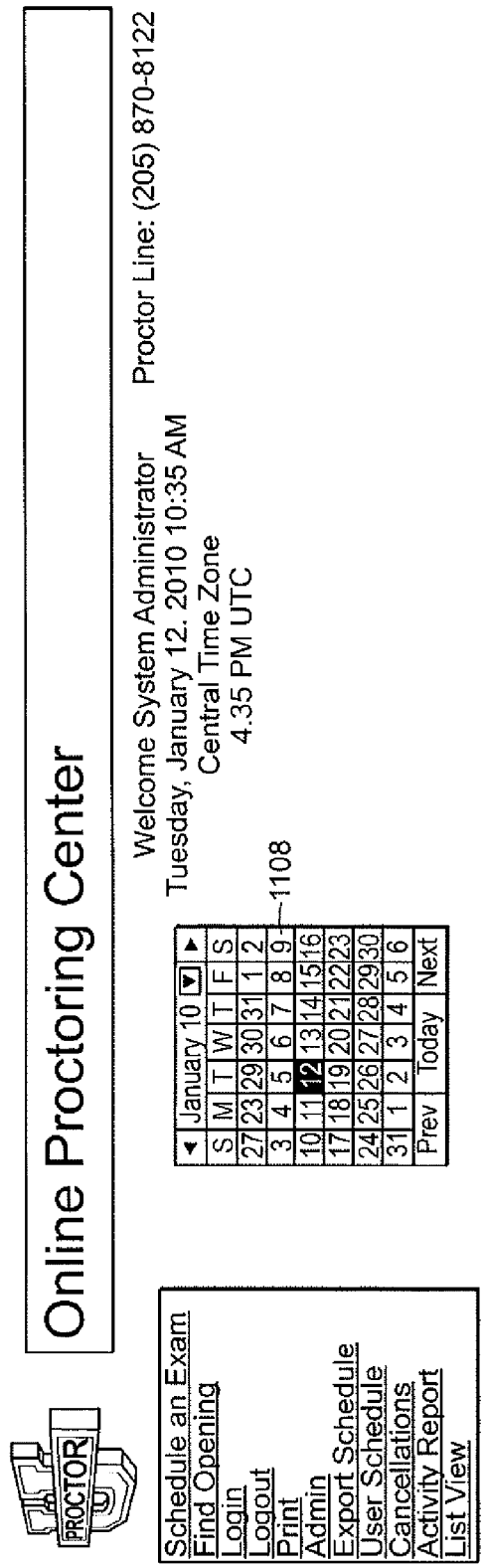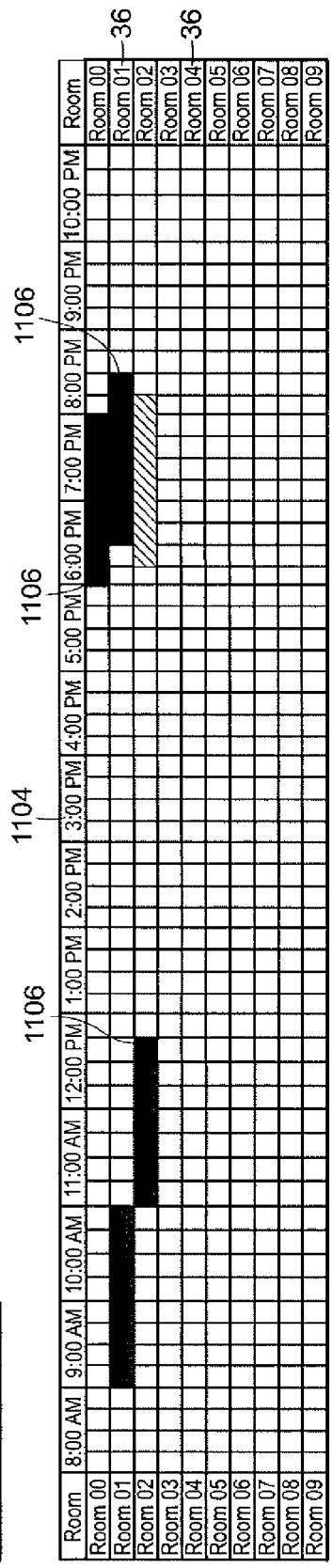
The administrator's view of 10 available Virtual Exam Rooms.
FIG. 11

Online Proctoring Center

Proctor Line: (205) 870-8122

Reservation: Michael Killian

Name of Test: HIST 380.1 - History of Intelligence, Part2 - L Hoffman

Proctor Data:

Exam Length:

Comments:

- (Select)
- CJ 611 - White Collar Crime - L Rockwell
- CJ 328.1 - Introduction to Vehicular Security - D Juna
- CJ 366 - Managing the Security Organization - J Gauthier
- CJ 452 - Infiltration Techniques - B Bechtel
- CJ 486 - Bomb Threat Management - M Savasta
- CJ 530 - Evidence & Crime Scene Management - J Gauthier
- CJ 535.1 - Advanced Vehicular Security - D June
- COM 510 - Advanced Protocol, Manners, Etiquette - G. Moore
- ENG 330.1 - Writing for the Intelligence Professional - L Rockwell
- HIST 375 - History of Executive/Dignitary Protection - G Moore/M Glasser
- HIST 397 - History of Intelligence, Part 1 - DeGreaves
- HIST 380.1 - History of Intelligence, Part2 - L Hoffman
- HIST 430 - Religious Extremism - S Greaves
- INT 300 - Introduction to Intelligence - A D/Avila
- INT 380.1 - World Intelligence Agencies - L Klumb
- INT 398.1 - Introduction to Threat Assessment - A Corbin
- INT 400 - Counterintelligence - K Sokol
- INT 401 - Elicitation and Briefing/Debriefing - J Gauthier
- INT 415.2 - Chemical, Biological, Radiological and Nuclear Weapons - J Bacigalupi

← 1200

← 1202

The student's view

FIG. 12 http://pc.kal-soft.com/ActivityReport.asp?location=1&date=1/12/2010

Online Proctoring Center

Proctor Line: (205) 870-8122

Activity Report

| | |
|---|---|
| School: | All Schools ▼ |
| Student: | All Students ▼ |
| Start Date: | 12/12/2009 |
| End Date: | 1/12/2010 |
| Display Pictures: | ○ Yes ● No |

[Create Report]

☆ http://pc.kal-soft.com/EditReservation.asp/reservation=/48/&date=1/12/2010

Online Proctoring Center

Proctor Line: (205) 870-8122

Edit Reservation

School: [All ▼]
Student: [Adam Smith ▼]
Proctor: [Black Rebecca ▼]  [info]
Station: [Room 02 ▼]
Name of Test: [Admin Law & Business Organizations ▼]
Start Date/Time: [1/12/2010] [▫] [6:15 PM ▼]
End Time: [8:15 PM ▼]
Comments: [                    ]

← 1500

[Update] [Delete] [Back]

Proctor "Edit Menu"

FIG. 15

The contact window a proctor can access for each appointment displays all contact info for that student.

| | Edit Users | |
|---|---|---|
| edule | Location to Work With: | Pupilcity Students ▼ |
| rs | | |
| Station | School: | (All) ▼ |
| ieral | User: 1804→ | (New User) ▼ |
| r Types | Display Inactive Users: | ☐ |
| Types | Notify User of Active Status Change: ○Yes ⦿ No | 1800 |
| ools | | |
| m Lists | | |
| ə Zones | | |
| cel Codes | | |

| General | Contact | Stations | Credentials | Photo | Place Holder | Locations | ory
vity Report
cel Report ail
ort

| User Type: | Administrator ▼ |
|---|---|
| First Name: | |
| Last Name: | |
| User ID: | |
| Password: | [Auto Gen.] |
| Login All Day: | ○Yes ⦿No |
| Primary Location: | Publicity Students |
| Show User's Name to All: | ○Yes ⦿No |
| Active: | ⦿Yes ○No |
| School: | Andrew Jackson University |
| Time Zone: | (select) |
| Sort Order: | 0 |
| Color: | [Pick Color] [Reset Color] |
| Last Reservation Date: | 1/12/2010 1:30:19 PM |
| Computer Type: | ⦿PC ○Mac |

[Add]
1802

The Edit/Add User Menu

FIG. 18

Online Proctoring Center
Proctor Line: (205) 870-8122

| Schools | |
|---|---|
| School: | (New School) |
| School Name: | |
| Sort Order: | 0 |
| Color: | ☐ [Pick Color] |
| Use Term Dates: | ○Yes ●No |
| Start Date: | 1/12/2010 |
| End Date: | 1/12/2010 |
| User Exam List: | ○Yes ●No |
| Active: | ○Yes ●No | eMail Message Text

Subject:

Message:

Tokens

<name>
<date>
<time>
<exam>
<url>
<computer>
<userid>
<password>

[Add]

1900

Schools Admin Console

FIG. 19 http://pc.kal-soft.com/AdminEditExamList.asp

Online Proctoring Center
Proctor Line: (205) 870-8122

| Schools |
|---|
| School: (Select) ▼ |
| Exam: (Select School) ▼ |
| Course Number: [          ] |
| Description: [          ] |
| Length: (not specified) ▼ |
| Instructor: [          ] |
| Use Effective Dates: ○Yes ●No |
| Start Date/Time: 1/12/2010 ▣ 8:00 AM ▼ |
| End Date/Time: 1/12/2010 ▣ 8:15 AM ▼ |

Active: ○Yes ●No   [Add]

2000

Exam List Settings

FIG. 20 http://pc.kal-soft.com/CancellationReport.asp

Online Proctoring Center
Proctor Line: (205) 870-8122

CancellationReport

| | |
|---|---|
| School: | (All Schools) ▼ |
| Student: | (All Students) ▼ |
| Cancel Reason: | (All Reasons) ▼ |
| Start Date: | 12/12/2009 |
| End Date: | 1/12/2010 |

[Create Report] ← 2100

Cancellation Report in the Admin Console

FIG. 21

ONLINE PROCTORING PROCESS FOR DISTANCE-BASED TESTING

CROSS-REFERENCE TO RELATED APPLICATION

This application is a continuation of U.S. application Ser. No. 13/007,341, filed Jan. 14, 2011, which claims priority to U.S. Provisional Application No. 61/295,508, filed Jan. 15, 2010, the disclosure of each of which is incorporated herein by reference.

BACKGROUND OF THE INVENTION

This invention is directed to a system and method for proctoring an exam, and more particularly, for remotely proctoring an exam across a distributed network.

Since the invention of the classroom, their have been exams to determine how well a student has learned the subject matter. With the advent of large classes, and written exams, the monitoring (proctoring) of exams has been a necessity. As well known in the art, teachers, and then later professional proctors, remain in the classroom to observe the exam taking procedure to prevent false results through cheating. This in person proctoring of exams has been satisfactory for use in conventional education environments. However, the advent of distance learning by educational institutions such as Andrew Jackson University, the University of Phoenix and others have made it impracticable to personally monitor each student taking an exam because without the commonality of the physical classroom, the students are too widely disbursed.

Many institutions and companies faced with this problem have attempted to circumvent it by diluting the course requirements and eliminating the requirement of a proctored exam in lieu of written papers or projects. Those institutions who had tried to solve the problem approached the situation with a high level of automation and the lowest level of human interaction possible making the system rife for fraud.

Accordingly, a system and method for overcoming the shortcomings of the prior art by enabling a live proctor to monitor a student's exam process, including student identification, as well as the immediate exam environment is desired.

SUMMARY OF THE INVENTION

FIG. 3 is an example of a scheduling screen presented in accordance with the invention;

FIG. 4 is an exemplary screen shot of a reservation interface in accordance with the invention;

Figure 5:
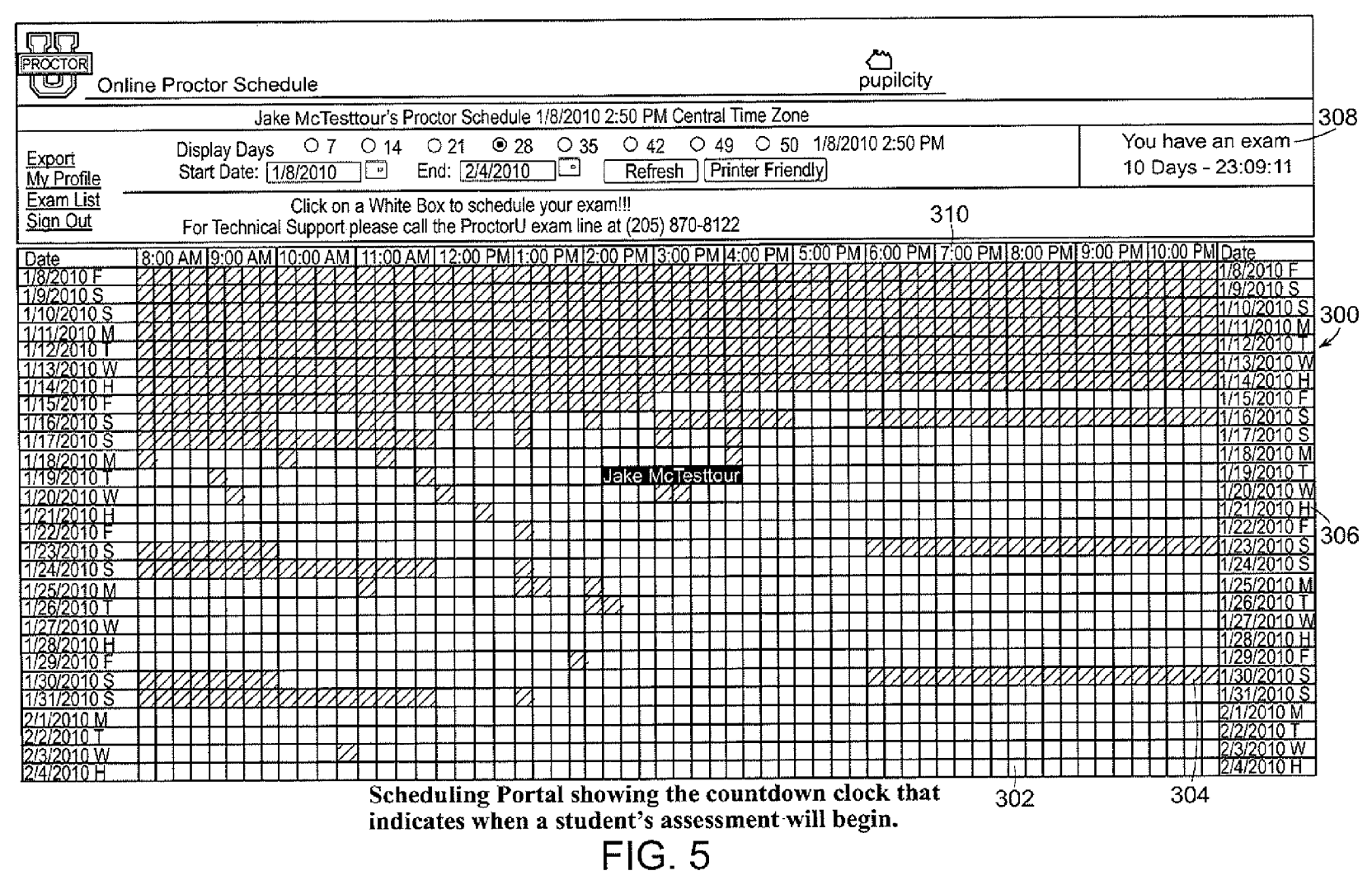

FIG. 5 is a scheduling portal with countdown clock in accordance with the invention;

FIG. 6 is an exemplary screen shot showing the beginning of an exam;

FIG. 8 is an exemplary screen shot of the interaction between a proctor and a student in accordance with the invention;

FIG. 9 is a screen shot of a collection of proctor reports in accordance with the invention;

FIG. 10 is a screen shot for setting the parameters of the exam throttle in accordance with the invention;

FIG. 11 is an exemplary screen shot of the administrator screen showing the administration schedule in accordance with the invention;

FIG. 12 is an exemplary screen shot enabling a student to schedule an exam in accordance with the invention;

FIG. 13 is a screen shot of an interactive page for a school report in accordance with the invention;

FIG. 15 is an exemplary screen shot of an edit menu to be utilized by a proctor in accordance with the invention;

FIG. 18 is an exemplary screen shot enabling an administrator or proctor to edit or add users to the system in accordance with the invention;

FIG. 19 is an exemplary screen shot of an administration console to be utilized by the institution providing the exam to be proctored in accordance with the invention;

FIG. 20 is an exemplary screen shot enabling the setting by the school of the exam parameters in accordance with the invention; and FIG. 21 is an exemplary screen shot of a cancellation report in accordance with the invention.

DETAILED DESCRIPTION OF THE PREFERRED EMBODIMENT

Figure 1:
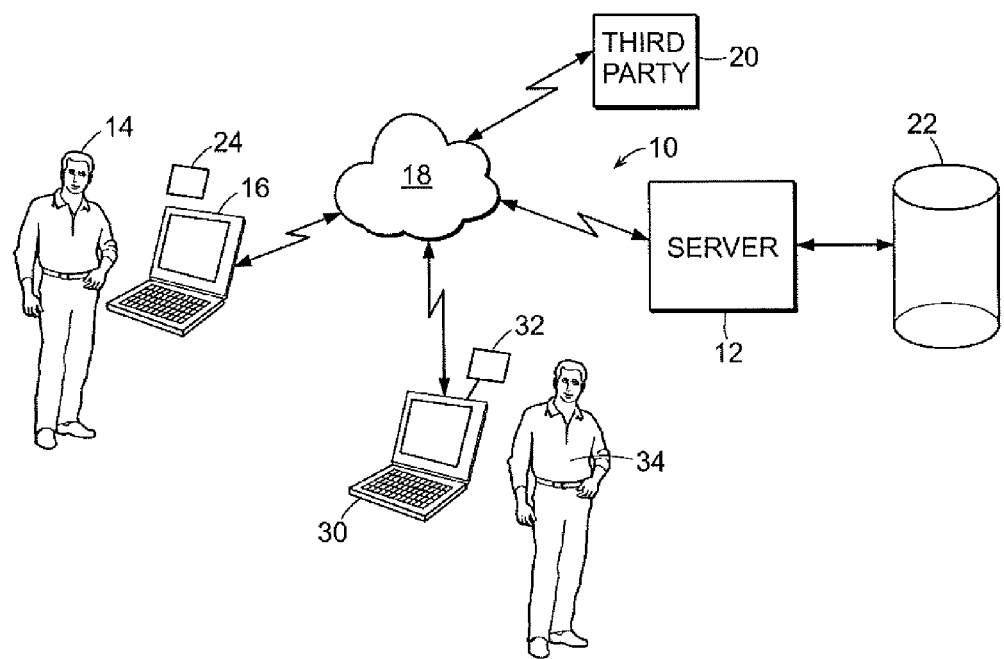
FIG. 1 is a schematic view of a system for providing remote proctoring in accordance with the invention.

Reference is made to FIG. 1 in which a system, generally indicated as 10, is provided which enables remote proctoring of an exam, even in parallel with an online exam administered to a student 14. System 10 includes a server 12 operatively communicating with a database 22. Server 12 communicates with students 14 at a student computer 16 through internet 18. Server 12 may also communicate with third party databases 20 such as institutions of learning (where exams may be stored), identity bureaus (where identifying data about a student is stored), or even provider's executable programs (such as exams or scheduling functions such as the virtual classroom to be discussed below) in one embodiment of the invention.

In a preferred embodiment, server 12 provides an interactive web based portal such as a web page for interacting with student 14. It should be noted that a webcam 24 is associated with computer 16.

Similarly, server 12 provides an interactive web based portal for proctors 34 and a proctor computer 30 which is also equipped with a webcam 32. Server 12 enables two way audio visual communication between computer 30 and computer 16 utilizing webcams 32, 24. It should be noted that computer 16, 30 may be any interactive device which allows each of student 14 and proctor 34 to communicate with each other utilizing the functionality described below. It should be noted that the preferred embodiment is an internet based system to facilitate the use of server 12 and third party database 20 with its associated servers. However, the computing device may be anything compatible with a webcam or other real time audio visual device and capable of such communication utilizing either the internet, radio frequency, telephone, cable TV, handheld personal data accessories or smart cellular phones by way of nonlimiting example.

It should be understood as well, that all of the functionality described below is capable of being performed by server 12 utilizing data stored at database 22. However, in a distributed network such as distributed network 10, it is contemplated that certain data and certain functionality may also be provided by third party 20 platforms. So by the way of example, server 12 may create the platform for two way audio visual communication, or provide the handshake between computer 16, computer 30 and a third party 20 platform.

Figure 7:
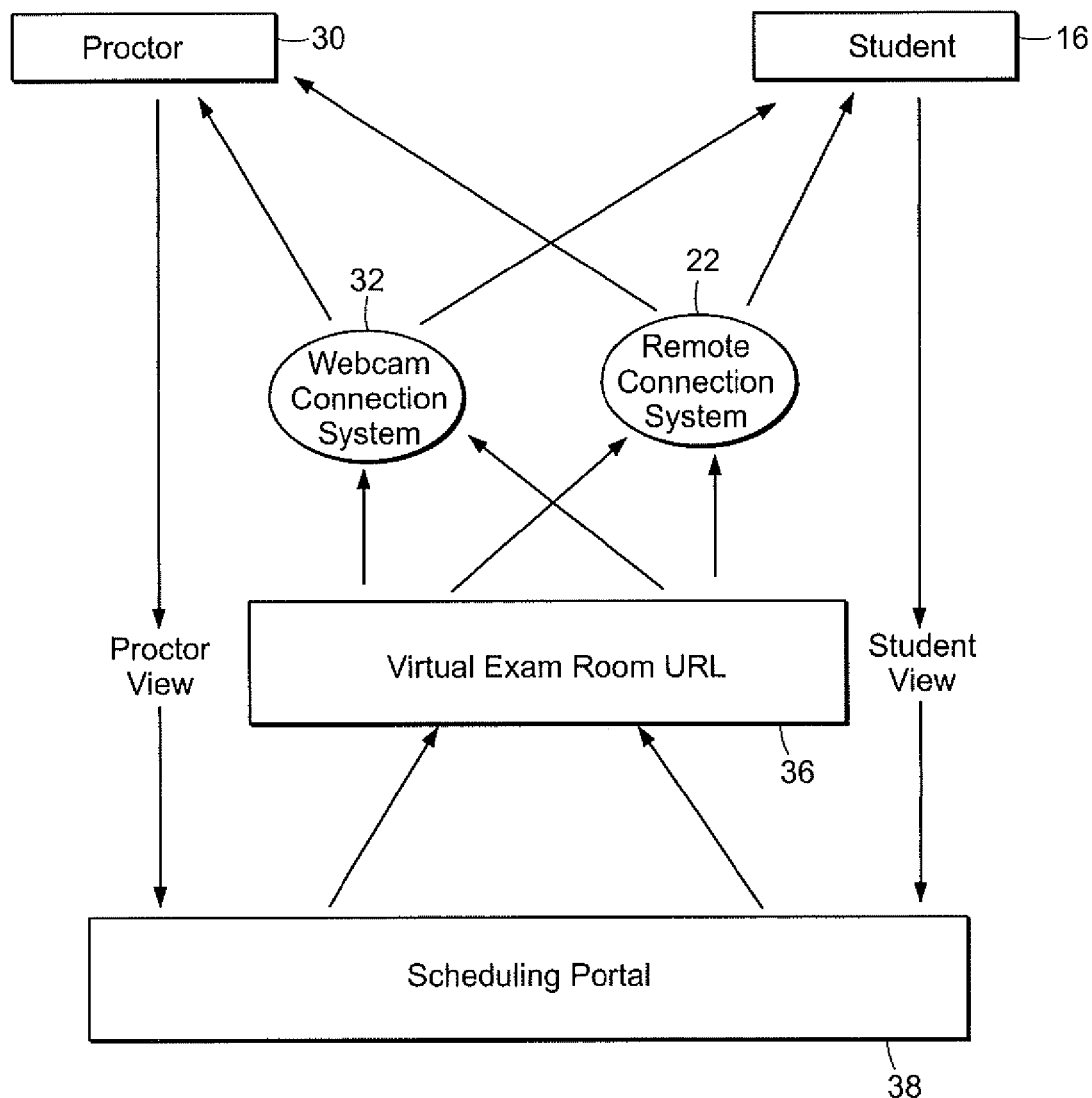
FIG. 7 is a flow diagram of the operation of the system in accordance with the invention.

Reference is now made to FIG. 7 in which a schematic diagram of the operation of system 10 is provided by way of background. In general, server 12 facilitates the activation and use of virtual exam rooms 36. Virtual exam rooms 36 are virtual constructs which mimic the functionality of a real world exam room in that it is a "place" in which an exam may be administered under the supervision of a live proctor 34 at proctor computer 30.

As will be described in greater detail below, virtual exam room 36 is a platform which enables the functionality which creates an exam room in response to a scheduling request. In other words, virtual exam room 36 is a communication between proctor computer 30 and student 16 reserved and enabled for a specific time and date and enabled upon server 12 confirming the availability of a time and date for the administration of an exam to a requesting student 14. Virtual exam room 36, as it "goes live" also is enabled for the proctor and student webcam servers, monitoring of the student computers, presentation of the exam to the computers in the virtual exam room and third party authentication. It connects these applets in a website page.

Generally a student 14 utilizes student computer 16 to communicate with server 12 to access a scheduling portal 38. Scheduling portal 38 provides a student with a schedule of available time periods by date and time during which an exam is capable of being proctored utilizing the system of server 12. Student 14 selects an available date and time which causes the creation of a virtual exam room 36. A proctor 34 utilizing a proctor computer 30 also accesses scheduling portal 38 to identify exam times for which a proctor 34 may be needed, or a schedule of virtual exam rooms 36 to which proctor 34 has been assigned.

The virtual exam room 36 provides the linking platform between proctor computer 30 and student computer 16 as a proctor 34 and a student 16 are both assigned to a virtual exam room 36. Utilizing virtual exam room 36 and utilizing respective webcams 24, 32 and a communication platform provided at server 12, or from a third party 20, student computer 16 and proctor computer 30 provide images respectively, in real time, of the proctor 34 and the student 16 making use of the virtual exam room 36 to administer an exam. Virtual exam room 36 also enables proctor 34 to view what is being displayed on a screen of student computer 16.

Human proctors are utilized by the invention to monitor students 14 taking exams in real-time. Since the majority of all exams taken outside of a classroom environment are delivered online, in a preferred nonlimiting example, the internet 18 is used for connection between the student 14 and proctor 34. The rest of the process is performed in a set of logical steps.

The Student Process

Figure 2:
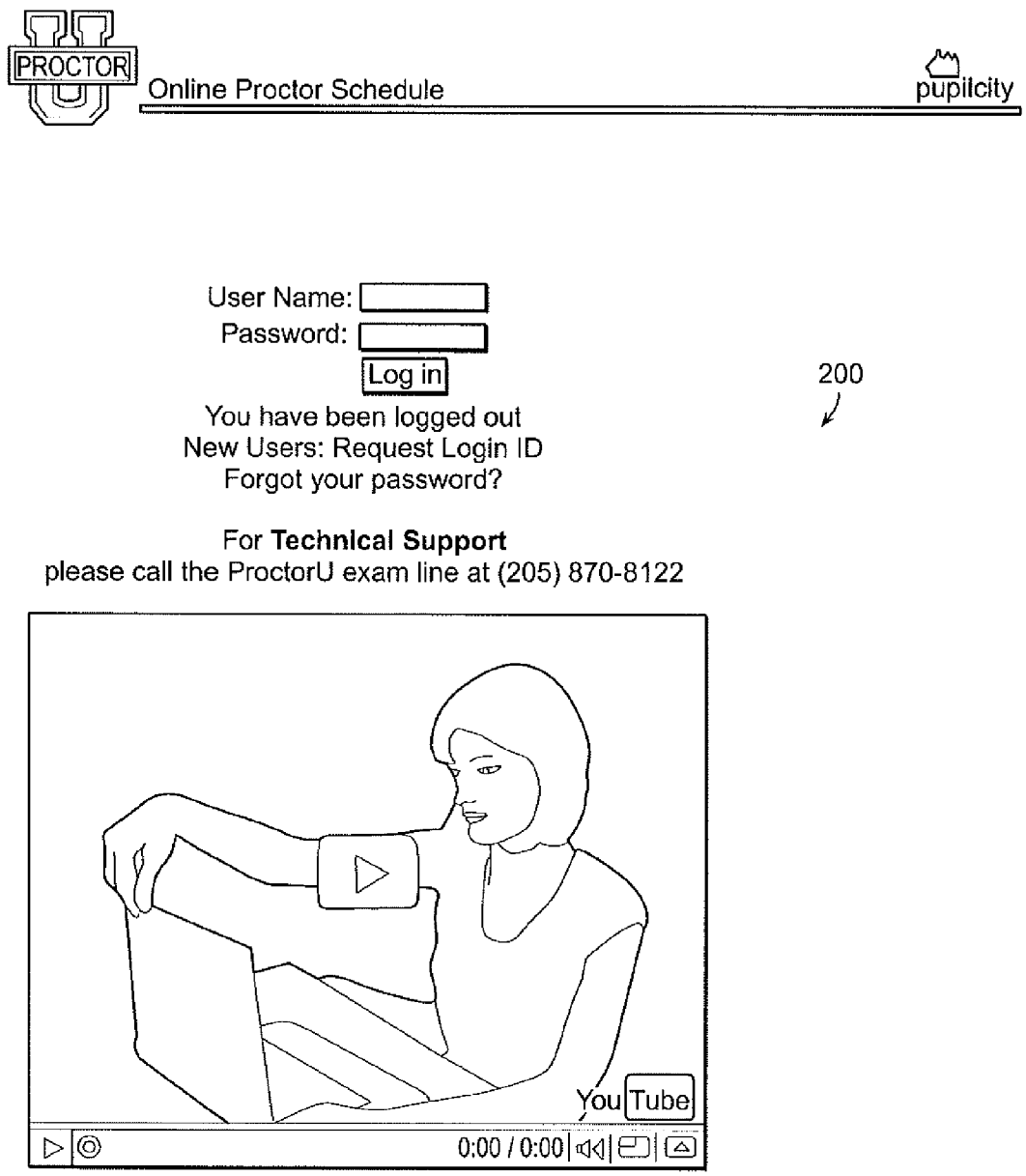
FIG. 2 is an example of a log in portal for use by the exam taking student in accordance with the invention.

The process begins with student 14 accessing a Scheduling Portal 38, a website that server 12 runs utilizing database 22. A student 14 wishing to schedule a time to be proctored is provided with a login to the Scheduling Portal 38 (FIG. 2). As student 14 enters log in formation, server 12 creates a unique user number that is entered into the database 22 and is the identifier for all data collection related to this student 14. As student 14 creates their login they are prompted by server 12 to enter contact information into system 10 including mailing address, phone numbers, and email addresses by way of nonlimiting example. Student 14 is also prompted to enter their local time zone at computer 16. Once the time zone is entered, all presentations of appointments and current time are presented to student 14 in their indicated local time.

Once an appointment time is created by server 12 as a function of student inputs at scheduling portal 38, the appointment time is stored in database 22 and recorded in Coordinated Universal Time (UTC). System 10 maintains a central clock that runs on UTC and is constantly updated.

Times are converted by server 12 checking the database 22 record associated with the student 14 to determine what time zone they have selected. Server 10 then retrieves the recorded difference between UTC and the student's time zone from database 22 and makes the addition or subtraction to the UTC time of the appointment. The server 12 also tracks dates when the difference is set to change for Daylight Savings Time and makes the necessary addition or subtraction. This new time is the one shown to student 14 at computer 16. All times are converted before an email is sent to the student confirming information about the time and date of an exam.

All times displayed on any web page in the schedule are converted to the student's time zone before being written to the page presented at computer 16. For example: if a student 14 makes an appointment for 11:00 AM Central Time, server 12 checks the current difference between UTC and Central. Since the difference may be −6, in this example, server 12 adds 6 hours to the appointment and records it on the schedule at 5:00 PM, which is UTC time. When the student is emailed the confirmation for this appointment, the system will check database 22 for the student's time zone. Server 12 determines that the appointment is recorded at 5:00 PM UTC and that the student's time zone is Central Time. Server 12 then checks database 22 for the difference between Central Time and UTC and returns −6. Server 12 then takes 5:00 PM and subtracts 6 hours to get 11:00 AM. This 11:00 AM time is then inserted into the email delivered to computer 16.

Once a login account is created for student 14, student 14 has the ability to login at a login page 200 to system 10 at any time using the credentials they entered in the sign up process. Upon the next login, student 14 is given the option at a scheduling screen 300 (FIG. 3) to select a date and time they wish to take an exam. Available dates 306 and times 310 are shown as white boxes 302 on a calendar grid. White boxes 302 can be selected at computer 16 to add an appointment at the corresponding date 306 and time 310. Dark squares 304 indicate unavailable times.

As will be seen, system 10 utilizes live actual monitoring of student identification and behavior, therefore each student 14 must be assigned an available proctor 34. This schedule is a function of school parameters such as exam date, time and duration, by way of nonlimiting example, on the one hand, and proctor 34 availability and the maximum number of students that can be handled by a single proctor 34 on the other.

Server 12 determines open dates by enabling an available virtual exam room 36 as a function of exam and proctoring rules created as a function of the school parameters stored at database 22. These virtual exam rooms 36 are stored in database records with associated variables held in other database records. These variables control an associated URL of the page student 14 is to be sent to take their exam. In other words, server 12 may send student 14 to a virtual room 36 created by a third party 20, or create virtual rooms itself as a function of data stored in database 22. The variables may include the room's name, which is usually a number. The name of the virtual exam room 36 is mapped in database 22 to the login information required by the proctor 34 to connect the webcams 22, 32. The number of exam rooms 36 also may correspond to rules governing the capacity of exams that can be proctored at any given time as stored in database 22 (see FIG. 10).

Each virtual exam room 36 has time slots allocated to allow an exam to begin at staggered intervals controlled by an administrator, which is currently set at 15 minutes (see Admin Console Section below). This allows for a single proctor 34, but multiple students 34 in a virtual exam room 36. Only one exam appointment can be active in a virtual exam room 36 at a time, i.e. have a proctor 34 actively communicating with a student 14, such as during the identification process discussed below. Virtual exam rooms 36 can be added and deleted in the Admin Console.

System 10 relies on live proctoring in a virtual exam room 36. Because proctoring is live, the system must be enabled to control the rate at which proctoring occurs. In this way, a single proctor 34 is not overwhelmed in its attempt to initialize exams for a large number of students 14 as initialization requires the steps of identity confirmation, environment validation (e.g. no extraneous materials are present in a closed book exam by way of example), in addition to the visual monitoring of the administration of the test once initialized. To this end, proctor 34 or an administrator of several proctors 34 is provided with a throttle function to control the flow of students 14 scheduling exams requiring proctoring.

Figure 10:
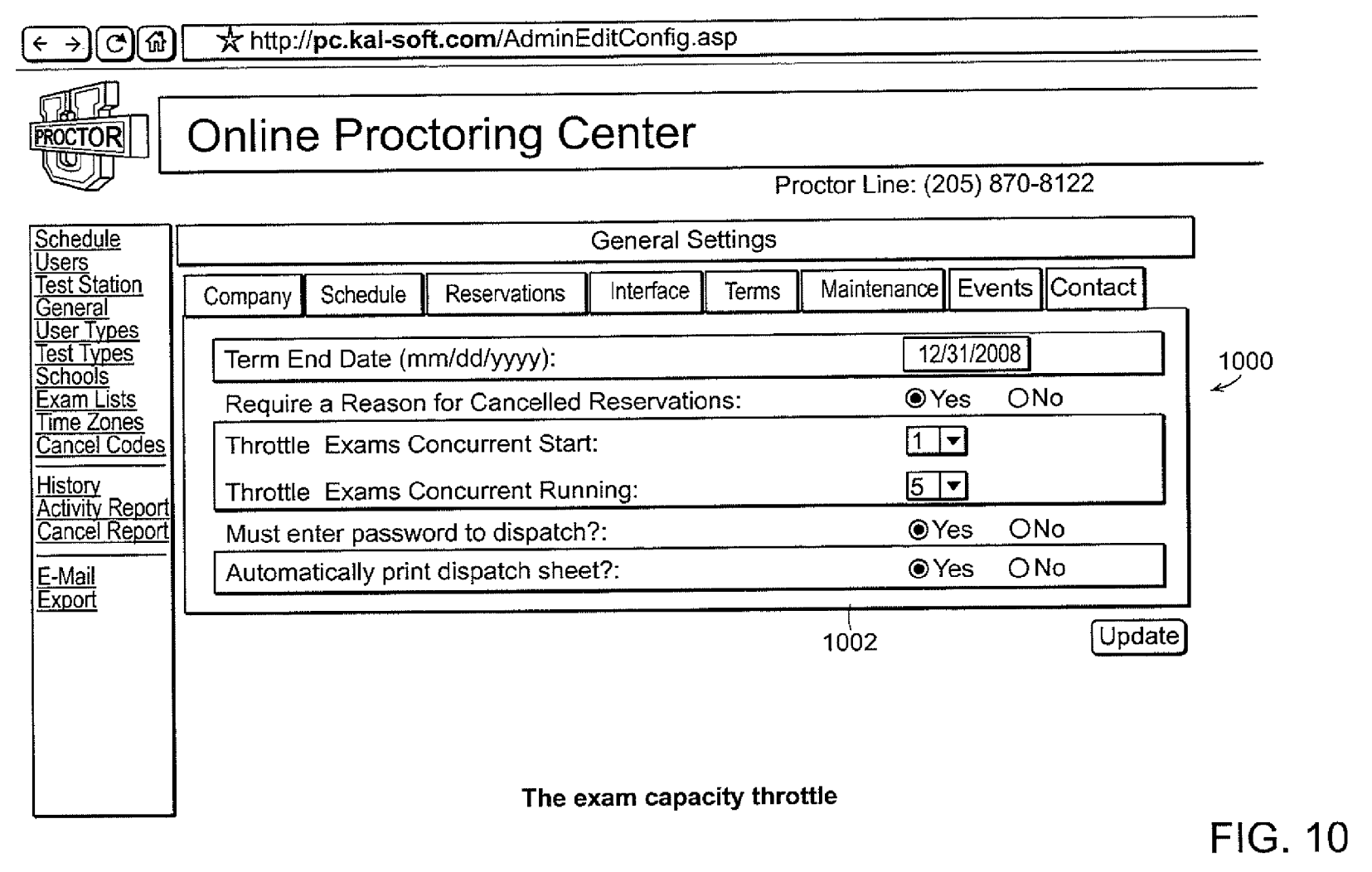

Reference is made to FIG. 10 in which a screen shot 1000 shows a general settings input including an input page 1002 for inputting the manner in which reservations may be made such as in the instant case in which only a single exam may be started at any one time and no more than five exams may be proctored concurrently by any one proctor. It should be noted, that this is the gating function in the system and intentionally so. It controls the number of exams which may be given in a virtual classroom 36 at the same time. Therefore, it controls the number of exams which may be scheduled before a white box 302 is converted to a dark box 304 at scheduling portal 38 by server 12.

The schedule also has a "throttle" for exam capacity. This functionality allows changes to the number of virtual exam rooms 36 available for students 14 to reserve and will also affect the availability a student 14 will see when they attempt to add an exam. This is done by the proctor's administration through an Admin Console (see Admin Console Section). Operationally, human proctors can only manage starting a maximum of two exams at the same time. As discussed above, the throttle function allows management of how many proctors must be working at once by controlling the number of exams that can begin at the same time and how many exams that can run simultaneously.

For example: System 10 has ten active virtual exam rooms 36, and a student 14 wants to schedule a two-hour exam at 10:00 AM. Server 12 will search for an exam room 36 that is open from 10:00 am until 12:00 pm. Once it finds a room 36, it will operate on the throttle settings stored in database 22 to determine how many exams are allowed to begin at once. Server 12 then determines whether adding the requested appointment will keep it under that number. Server 12 then checks the throttle values to determine the number of simultaneous exams allowed and determines whether adding the appointment in that time frame will keep it under that number. Once all of these conditions are met, server 12 adds student 14's appointment to the schedule 300.

As discussed above in connection with FIG. 7, server 12 enables a platform for scheduling a virtual exam room 36, and as will be seen below, at the time and date scheduled, enables communication between a computer 16 and computer 30 utilizing respective webcams 24, 32. This allows a third party 20 (which cumulatively and alternatively represents a server and database of nonproctoring entities) such as a university to make available at its server the exam for access by computer 24. In this way, the proctoring provided by server 12 and the exam provided by third party 20 run in parallel, without interference, at computer 24. It is not necessary, unless desired by third party 20, for proctor 34 to have access to or see the exam itself. In this way, system 10 provides an exam platform agnostic proctoring system.

Each third party institution 20 is given the opportunity to customize its interface for their test-takers, so a student 14 will indicate the exam they intend to take by either typing the name of the exam into computer 16 or selecting at computer 16 from a pre-populated exam list provided at a web page provided by a third party 20 or server 12. Third party 20 can set an infinite number of variables associated with each exam. Some of these variables can include the dates and times the exam is available, the name of the exam, the associated faculty member, and exam length. These variables can be stored at database 22 either manually by proctor administrators through the Admin Console (See Admin Console Section). They can also be populated automatically from the institution's own database 20. This is done by the institution making the data available in a readable format to server 12 (for example, an XML file). The data from the institution's system is requested and returned to the server 12 any time a student wishes to add an appointment.

Figure 3:
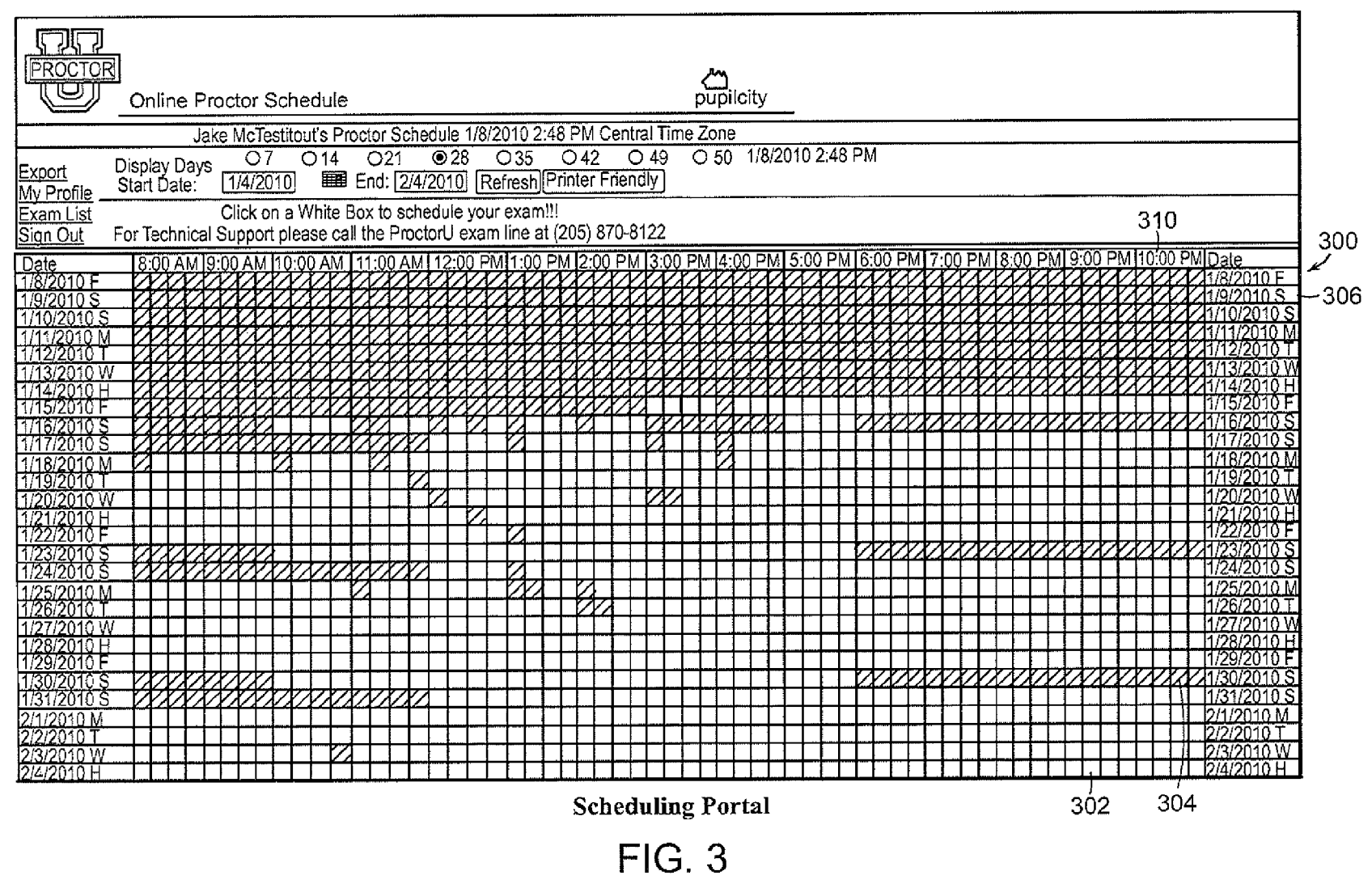

No matter the method that the exam variables are entered into system 10, the same process is performed by student 14 when attempting to add an appointment. Student 14 selects a date and time they wish to take an exam at page 300 of scheduling portal 36 (FIG. 3). Server 12 provides a reservation page 1200 at computer 16 and server 12 populates a drop down list 1202 of available exams with data from third party 20 or stored in database 22 with each entry (FIG. 12).

Figure 4:
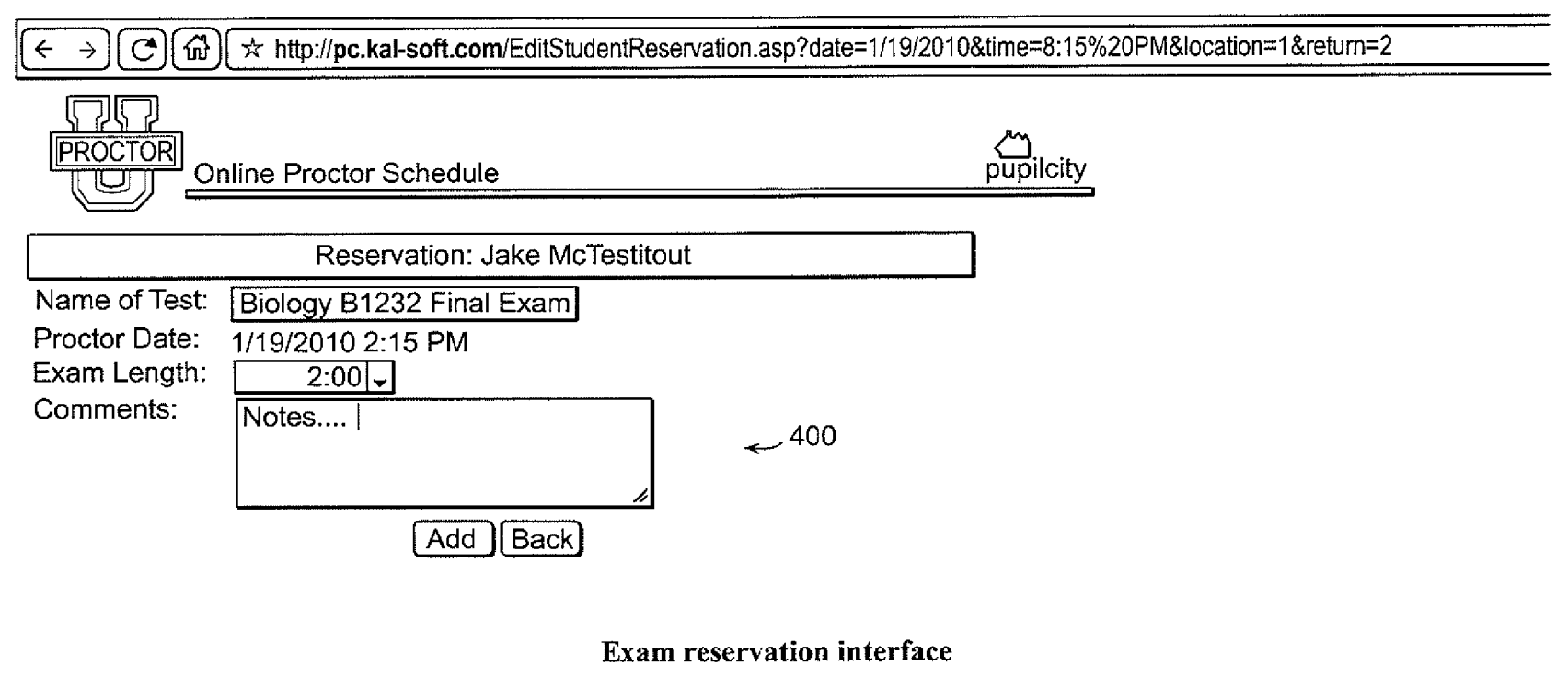

Student 14 selects any variables that the institution desires at a page 400 (FIG. 4). When the student 14 selects the exam and attempts to add it to the schedule 300, server 12 will first determine the associated database entries to determine whether the exam is available at the date and time the student 14 is requesting. If it is not, server 12 sends student 14 an error message at computer 16 and is advised by server 12 as to when an appointment is available. If the exam is available in the time frame student 14 is requesting, system 10 performs its normal set of checks for available virtual exam rooms 36 as a function of rules including throttle settings. If server 12 determines that settings allow it, an appointment for student 14 is added to the schedule 300.

Student 14 is given the opportunity to print a confirmation page and server 12 sends a confirmation via email to computer 14. Student 14 is then returned to the calendar grid 300 of scheduling portal 36.

Server 12 generates a countdown clock by comparing current time to the scheduled appointment time, which is displayed as a clock 308 in the schedule 300. Clock 308 counts down until the time the exam is scheduled to begin. This countdown clock is calculated by server 12 first recognizing that the student 14 has an appointment on the schedule 300. Server 12 then takes the time of the next appointment student 14 has on schedule 300 (in UTC) as stored in database 22 and subtracts the current date and time (in UTC) from the appointment date. The difference is then displayed on the schedule grid page 300 as clock 308 and is periodically updated; every second in a preferred embodiment (FIG. 6). Once the exam is scheduled to begin, the countdown clock 308 becomes a button 312 the student can select to begin the proctoring session (FIG. 6). This process is done when server 12 calculates the difference between the appointment time and current time is zero or a negative number. The button, in a nonlimiting embodiment, is a html link to a URL that corresponds to the virtual exam room 36 in which the student's appointment is scheduled.

Once the student selects virtual button 312, server 12 provides a new page at computer 16 to begin the proctoring process. The first step is to connect proctor 34 and student 16 via a live webcam session. The new web page automatically detects the student's webcam 24 and connects them to a live proctor's 34 webcam feed at computer 30 and webcam 32 (FIG. 8). This is done via a live video conference executable application into the page. This process may be done in a preferred embodiment through a platform provided by third party 20, but can also be done by server 12. The webcam connection allows the student 14 and proctor 30 to see and hear each other. The proctor 30 then greets the student 14 and talks them through the next steps.

Student 14 is then instructed to proceed to the next step utilizing an interface 800 (FIG. 8, step two). Student 14 initializes a remote connection to proctor 34, which allows proctor 34 to monitor the student's screen and system for computer 16. The connection also allows the proctor to control the peripherals (mouse and keyboard) of computer 16 and monitor the system health of computer 16, which aids in technical support needs. This is done through a third party 20, but can be done by server 12. This method currently works on both Windows and Mac computers. This capability is tied to the technology used, whether from a third party or from server 12.

From there, the student 14 is instructed to prove their identity through an approved authentication method. Examples of authentication methods include: Proctor 34 instructs the student to present picture identification to webcam 24. The type of identification acceptable is determined by the institution for which the student 14 is taking the exam and stored either at database 22 or third party database 20 and sent to proctor 34 as part of the process. Student 14 may also be asked to enter their name and home mailing address into a pop up window presented at computer 16, but monitored at server 12 and/or computer 30. This data may be transmitted to a third party 20 which in response returns a series of questions generated from data stored at third party database 20 related to the student 14 at computer 16. This could be public and privately purchased data that deals with previous addresses, real estate history, old phone numbers, and other types of information generally known collectively only to the student 14 by way of nonlimiting example. Student 14 is to answer the questions while proctor 34 watches via webcam 24 and remote connection. If student 14 scores a high enough percentage on the authentication exam, they are allowed to proceed.

The percentage can be determined by the institution or proctor 34. The passing or failing of this authentication exam, as well as the contents of the questions are stored in the database of third party 20. The student may also have a picture taken of them through webcam 24 by the proctor 34. This picture is then stored in database 22 and associated with student 14. It can be viewed by proctor 34 at any time to verify that the appearance of the student 14 who has connected via webcam 24 appears to be the same student 14 who has taken previous exams. Any combination or all of these three methods can be used to authenticate a student's identity at the discretion of the institution.

After the completion of the steps above, student 14 is instructed to begin the exam. If the exam is being delivered online, student 14 is directed to open another browser window and navigate to the exam on the website of third party institution 20. System 10 does not require the exam to be delivered in any specific fashion and works with any Learning Management System (LMS). The reason the system works with any LMS is that system 10 enables viewing at computer 30 the images displayed on computer 16 so that proctor 34 is simply monitoring what is being shown on the student's monitor. For example, if an institution wants the student to use a Microsoft Word during the exam, the proctor simply monitors the student doing so and makes sure they use nothing else. This allows system 10 to be platform agnostic. The proctoring is going on in parallel with whatever else student 14 is doing on computer 26.

If the exam is being delivered via paper, proctor 34 will instruct the student to complete the exam while on webcam 24 and will make sure student 14 completes it in the manner directed by the institution.

Figure 9:
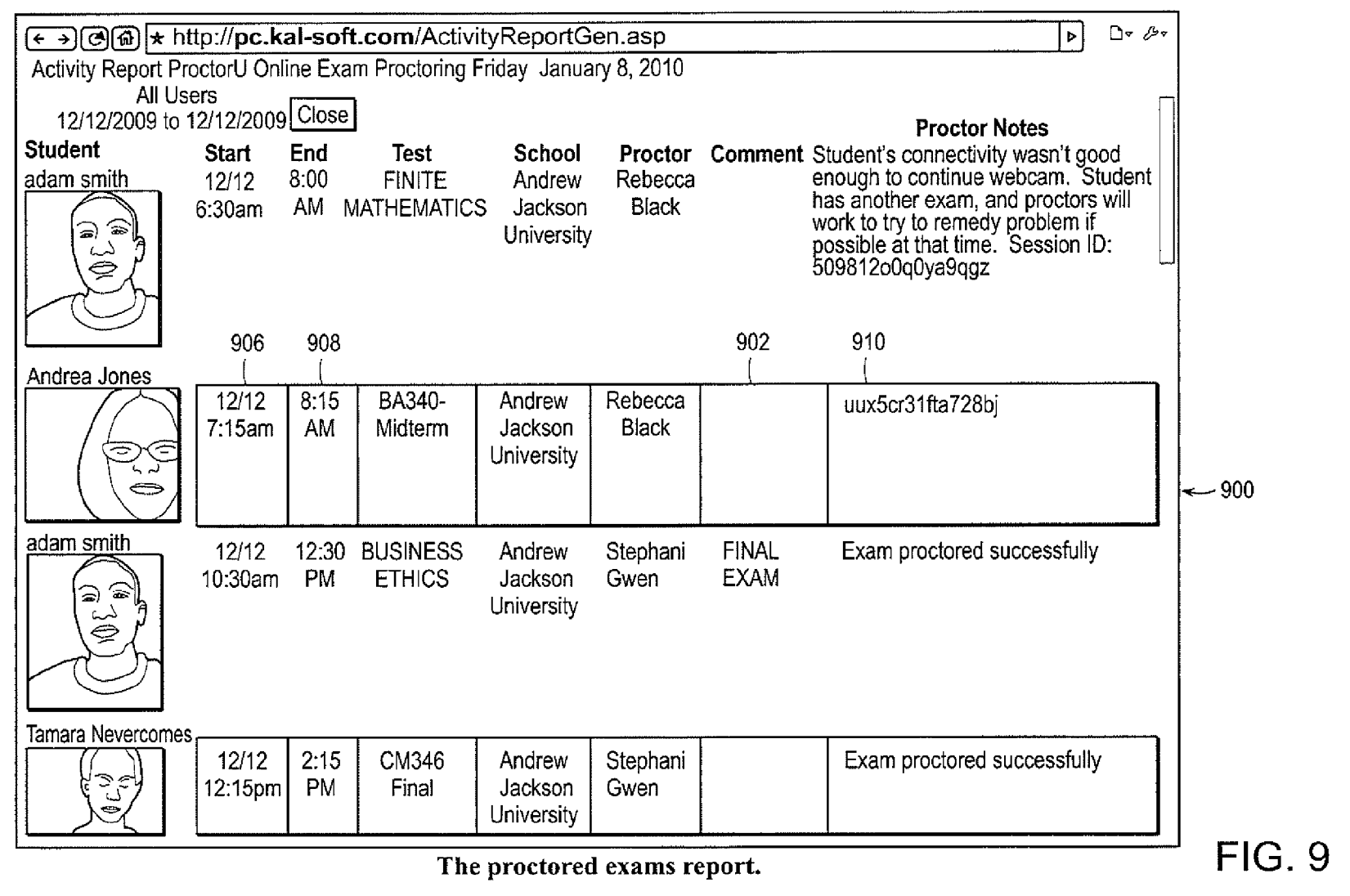

After the exam is complete, student 14 "clocks out" by entering an end instructed at computer 16 and proctor administrators, as well as selected administrators of the institution, are able to generate Activity Reports 900 (not shown) detailing all past proctoring sessions. If the exam times out then proctor 34 can also end the exam from computer 30, or server 12 may discontinue access to the exam. Any variable that the institution wishes to be tracked can be displayed from this report. The report is generated by providing to computer 30 a number of drop-down menus 1302 at a page 1300 that contain variables that allow the Administrator to narrow down the data that is displayed in any given report (FIG. 13). The number of drop-down menus can be customized at the desire of the institution. A report 902 can contain, but is not limited to, pictures 904 of the student 14 who appeared on the webcam (if it was recorded), the start 906 and end 908 times of the exam, the time the student began and ended the exam, and notes 910 from the proctor (FIG. 9) shown at screen 900. Administrators are also able to see future exam appointments, manage lists of exams, and monitor daily schedules.

The Proctor Process

Operation of system 10 will now be explained as utilized by proctor 34. Proctors 34 are provided a different type of login into the System 10. These system 10 logins allow the proctors 34 to access the schedule 300 of scheduling portal 38 in a view that allows proctors 34 to quickly see the information at computer 30 they need in order to proctor efficiently.

Proctors 34 login from computer 30 though login process similar in operation to that used by a student 14 (FIG. 2). Once proctor 34 logs in, server 12 provides access to a page 1100 at computer 30 that displays the schedule 1102 in "Proctor View." Schedule 1102 is displayed showing the total number of virtual exam rooms 36 and all potential start times 1104 for the current day (FIG. 11). All proctor 34 appointments 1106 for that day are displayed in line with their corresponding virtual exam rooms 36 and the time they are set to begin. All appointments 1106 are color-coded by the institution for which the exam is being proctored. These colors are set in the Admin Console (see Admin Console section). This allows the proctor 34, at a glance, to know what login information to use to connect the webcams and what school's guidelines are to be consulted for this appointment 1106 as stored in database 22.

Above the display of virtual exam rooms 36 is a calendar 1100 accessible from computer 30. Each day on calendar 1108 can be accessed to display all appointments for that day in the corresponding virtual exam rooms 36.

Figure 14:
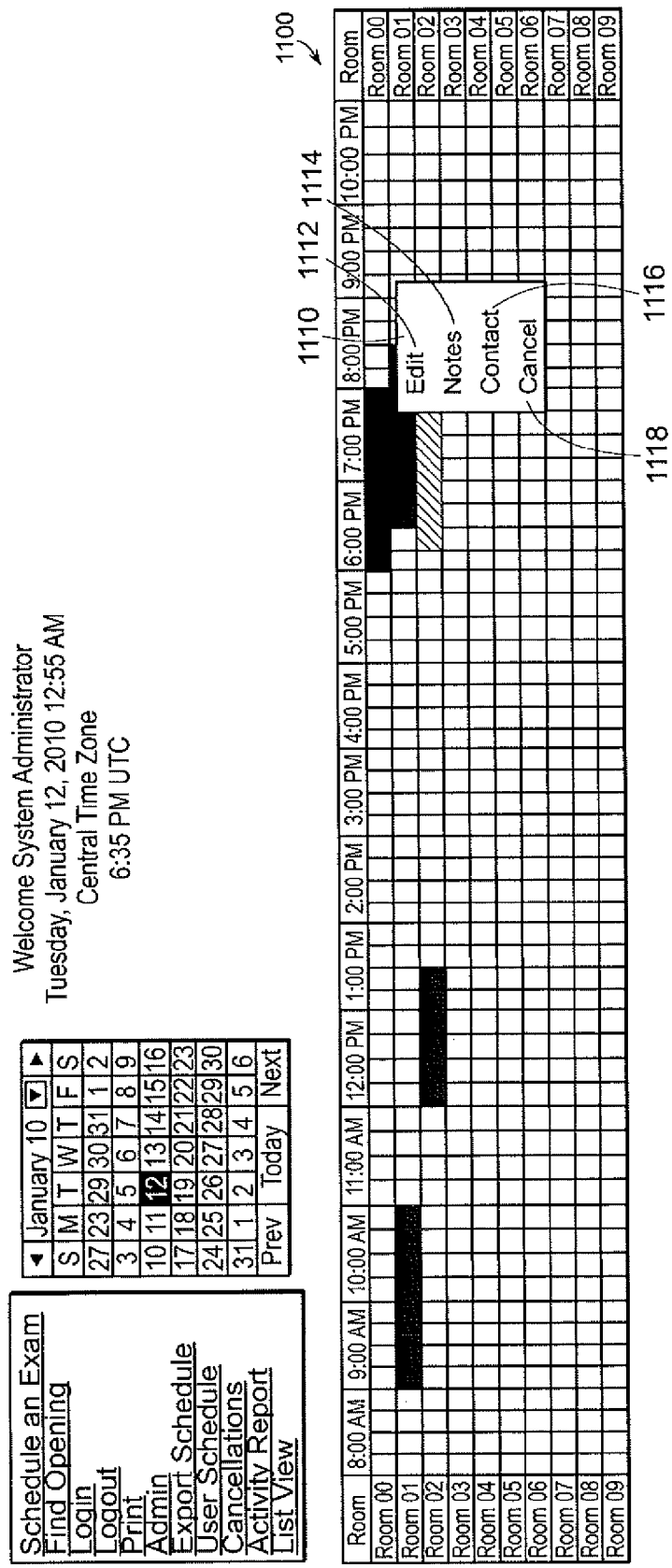
FIG. 14 is a screen shot showing the manner in which a proctor accesses an appointment in accordance with the invention.

Any appointment on the schedule can be clicked by a proctor 34. This will provide an accessible menu on page 1100 that offers proctor 34 the following options: Edit; Notes; Contact; and Cancel. (FIG. 14).

The Edit Function: When the proctor 34 selects Edit button 112 at computer 30, server 12 connects proctor 34 to a new page 1500 that pulls all data from the database 22 or third party 20 associated with this appointment 1106 (FIG. 15). Proctor 34 can edit any variable associated with this appointment 34. This can include, by way of example, but is not limited to the following: The ability to change the student 14 listed with the reservation 1106; The ability to change the name of the exam; The ability to change the start and end times of the appointment 1106; The ability to change the notes the student may have left at the time the appointment was made.

The Notes Function: By selecting Notes button 1114 server 12 provides access to a window that allows a proctor 34 to add text to database 22 and associate this text as "notes" about the proctoring appointment 1106. The notes may included, by way of example, but are not limited to, something student 14 did during appointment 1106, something proctor 34 noticed, or technical issues proctor 34 had connecting to the student 14. This data is displayed in the Activity Report 900 and can be viewed by proctors 34 and administrators from the institution.

Figure 16:
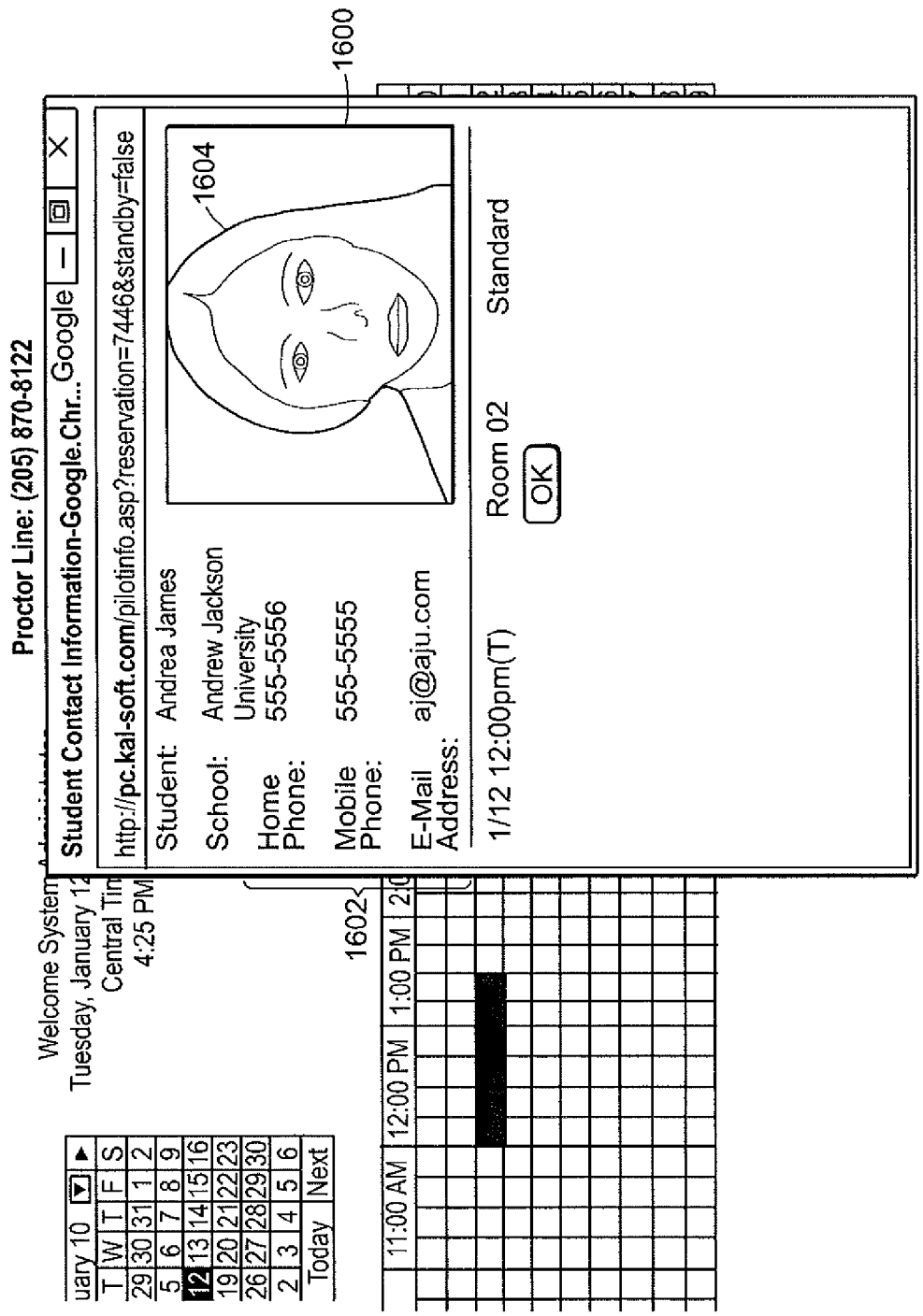
FIG. 16 is an exemplary review of a contact window for the proctor to access contact info for a particular student in accordance with the invention.

Contact Function: By selecting Contact button 1116, server 12 provides a pop up window 1600 that contains the contact information 1602 contained in database 22 that corresponds to this student's account (FIG. 16). Pop up window 1600 may also display the picture 1604 on file for that student 14, allowing the proctor to verify visually the student's identity as apart of an authentication process.

Cancel Function: Selection of Cancel button 1118 causes server 12 to allow proctor 34 to cancel an appointment 1106. A reason for cancellation may be included in a text box that will be recorded in database 22 and linked to this appointment 1106. This information can be pulled from the "Cancellation Report" in the Admin Console (see Admin Console).

Figure 17:
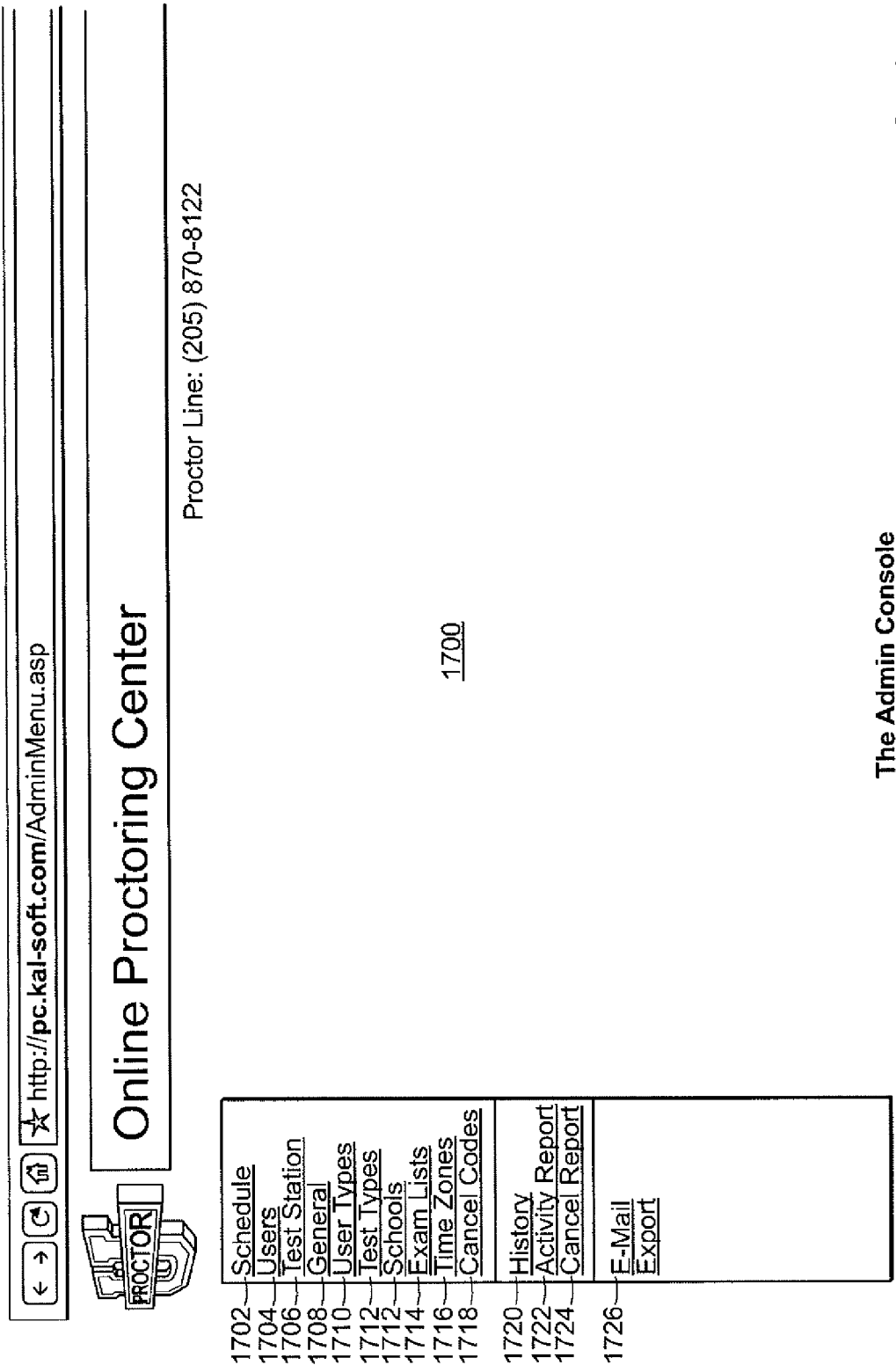
FIG. 17 is an exemplary screen shot of a proctor's administrative console in accordance with the invention.

Proctors also have access to the Admin Console which provides certain degrees of initialization and administrative control over system 10 and will be described below. Proctors 34 and Administrators have access to a Scheduling Portal's Admin Console 1700 (FIG. 17). In the Admin Console 1700, variables contained in database 22 that control mainline settings of the Schedule Portal 36 can be edited.

The Schedule Button: Selecting Schedule button 1702 from Portal's Admin Console 1700 causes server 12 to return the page displayed at a computer to the "Proctor View" of the schedule 1102.

The Users Button: By selecting a Users button 1704, server 12 enables an Administrator to add, edit, and delete information about all proctors 34, administrators, and students 14. This is done through a menu 1800 that allows displays of all profile information for each account (FIG. 18). If the Administrator wishes to add a new user, they enter the information from a remote computer corresponding to the new user and select the "add" button 1802 Server 12 causes a new set of records to be added to the database 22 and the user is given a unique User Number. If the Administrator wishes to edit an existing user, they select the user's name from the drop down box 1804 labeled "User." All existing profile data in database 22 for the user is displayed and can be edited by the proctor 34. When finished, selecting the "Update" button (not shown) will cause server 12 to update all the information associated with this user in database 22. Selecting a "Delete" button will cause server 12 to delete all information about the user from the database 22.

The Test Station Button: Selecting a Test Station button 1706 causes server 12 to enable the Administrator to create and edit all of the virtual exam rooms 36. A drop down box appearing at their computer enables administrators to select an existing exam room 36 or add a new exam room 36. All of the variables mentioned in the virtual exam room section above can be edited here. Virtual exam rooms 36 can be deleted from the database 22 (or third party 20) by selecting the exam room 36 in the drop-down menu and selecting the "delete" button.

The General Button: Selecting General button 1708 causes server 12 to enable an administrator to edit many of the general settings of the site such as the throttle rate at page 1000 (FIG. 10). In addition to these functions, the main contact information for the site is edited here. Administrators can also use this section to edit the hours of available time slots by selecting an "open and close" time. This changes the displayed time slots that are shown to proctors 34 and students 14 in the schedule grid 300. The increment at which time slots are available (currently set at 15 minutes) can be changed here as well. The Terms of Service for the site can be edited here as well.

The User Types Button: Selection of a User Type button 1710 causes server 12 to enable the Administrators to edit the data stored in database 22 for different types of users in the system, such as "proctor," "student," and "institutional admin." In editing these user types, variables that control their access to certain sections of the schedule 300 and Admin Console 17 and permissions to perform certain access can be edited here. Some of these variables include, but are not limited to, the ability to add appointments, the ability to view proctor comments, and how long a user is allowed to stay logged into the system without being prompted to re-enter their login credentials.

The Schools Button: Selection of a Schools button 1712 causes server 12 to enable an Administrator to add, delete, and edit data about an institution stored in database 22 (FIG. 19). Server 12 provides access to a page 1900 where settings for institutions can be customized. The sections include, but are not limited to, setting up the school to use exam lists (specific settings for each list is controlled as described in the Exam List section); and editing the email message that is sent to a student 14 of the institution when they make an appointment.

The Exam Lists Button: Once an institution has been edited utilizing page 1900, the Administrator selects the Exam Lists button 1714. Server 12 in response to selection of the Exam List button 1714 enables an Administrator to add exams to database 22 or edit exam information in database 22. As discussed above, each exam from each institution and variables associated with it are stored and mapped in database 22. These variables may be set, edited or deleted as discussed above in the Exam List and Appointment Section.

The Cancel Codes Button: Selecting a Cancel Codes button 1718 causes server 12 to enable the Administrators to set generic reasons that proctors 34 can select when canceling a student's exam appointment.

The History Button: Selecting a History button 1720 causes server 12 to enable an Administrator to access reports from database 22 on the addition of users, the addition or changing of appointments, and the changing of system settings as stored in database 22 as server 12 performs the functions discussed above. All changes in database 22 regarding these functions are logged in another section of the database, allowing for change reports to be displayed. This information is used for troubleshooting a problem after it appears to have happened to pinpoint the changes that may have caused it.

The Activity Report Button: Selecting an Activity Report button 1722 causes server 12 to provide Administrators with access to the same Activity Report 900 that institutional administrators use.

Cancellation Report Button: Selecting a Cancel Report button 1724 causes server 12 to provide Administrators with access to report on all appointments that have been deleted or canceled. In the same manner that Activity Report 900 is generated, relevant variables can be selected at a page 2100 to narrow the data returned so that all that is used is the information desired (FIG. 21).

Email Button: Selecting Email button 1726 causes server 12 to enable Administrators to send an email to any or all users of Schedule Portal 38 at the email address recorded in the database 22 that corresponds to their user profile.

The innovation behind the above approach is the virtualization of the traditional classroom testing experience. The use of human interaction combined with authentication methods maximizes the security and integrity of the proctoring session without making the process difficult for the student. Other systems focus on automation and not monitor in real time.

What is claimed as new and desired to be protected by Letters Patent of the United States is:

1. A server comprising at least one processor, and at least one memory including computer program code, wherein the at least one memory and the computer program code are configured to, with the at least one processor, cause the server at least to perform the following steps:
   control a number of exam start times presented to a test taker at a first remote computer for scheduling;
   provide a number of virtual exam rooms available to the test taker at the first remote computer for selected exam start times as a function of at least availability of a proctor at a second remote computer, maximum number of students that can be handled by a single proctor, exam start time and duration, and exam date;
   receive a scheduling request from the test taker at a first remote computer in response to the provided virtual exam rooms available wherein the scheduling request includes a selected virtual exam room at a selected exam start time;
   determine whether the received scheduling request from the test taker at the first remote computer causes a total number of requested virtual exam rooms to exceed the total number of available virtual exam rooms at a selected start time;
   if the scheduling request would not cause the total number of requested virtual exam rooms to exceed the total number of available virtual exam rooms, schedule an appointment between the test taker and one of the available one or more virtual exam rooms associated with the proctor at the second remote computer;
   after scheduling the appointment, receive a connection request at approximately the time of the scheduled appointment from the test taker at the first remote computer, wherein the first remote computer comprises a two-way video communication system;
   send a connection request to the proctor at the second remote computer, wherein the second remote computer comprises a two-way video communication system;
   start, by initiating active communication between the test taker at the first remote computer and the proctor at the second remote computer through the first and second computer, the assigned virtual exam room for the test taker at the first remote computer and the proctor at the second remote computer;
   administer an exam to the test taker at the first remote computer;
   relay live audio and video between the test taker at the first remote computer and the proctor at the second remote computer during the exam;
   allow the proctor to remotely control one or more input devices of the first remote computer during the exam; and
   after the exam is completed, generate activity reports comprising one or more of images and/or video of the virtual exam room during the exam, start and/or end times of the exam, and notes from the proctor at the second remote computer about the exam.

2. The server of claim 1, wherein the at least one memory and the computer program code are configured to, with the at least one processor, cause the server at least to limit a volume of test takers that can enter a particular exam room at a specific time based on exam duration and resource availability.

3. The server of claim 1, wherein the at least one memory and the computer program code are configured to, with the at least one processor, cause the server at least to determine a time in coordinated universal time and converting the coordinated universal time to local time for the test taker at the first remote computer to select an appointment time.

4. The server of claim 1, wherein the at least one memory and the computer program code are configured to, with the at least one processor, cause the server at least to determine a time differential between a current coordinated universal time and the coordinated universal time of a virtual exam room and create a countdown clock that is displayed to the test taker at the first remote computer prior to the exam appointment time.

5. The server of claim 4, wherein the countdown clock enables and links the test taker at the first remote computer to the virtual exam room at the appointment time.

6. The server of claim 1, wherein an image of the test taker at the first remote computer is taken by the first remote computer.

7. The server of claim 1, wherein the at least one memory and the computer program code are configured to, with the at least one processor, cause the server at least to receive customized input from one or more third-party institutions for the purpose of proctoring and administering an examination.

8. The server of claim 7, wherein the customized input consists of one or more of: examination data, time availability, duration, exam name, instructions for administration, and combinations thereof.

9. The server of claim 1, wherein the at least one memory and the computer program code are configured to, with the at least one processor, cause the server at least to authenticate the test taker at the first remote computer.

10. The server of claim 9, wherein the authenticating comprises one or more of verifying a physical identification card, reviewing a picture of the test taker from a previous session, and using knowledge-based challenge questions.

11. The server of claim 1, wherein the server is platform agnostic.

12. The server of claim 1, wherein test taker profile information is updated by the proctor.

\* \* \* \* \*